United States Patent Office 3,193,513
Patented July 6, 1965

3,193,513
POLYMERS OF BIS(HALOMETHYL)AROMATIC
COMPOUNDS AND PROCESS FOR PRODUCING SAME
Jack E. Cook, Bartlesville, Okla., assignor to Phillips Petroleum Company, a corporation of Delaware
No Drawing. Filed Dec. 2, 1960, Ser. No. 73,198
5 Claims. (Cl. 260—2)

This invention relates to the production of novel, moldable polymers. In accordance with one aspect, this invention relates to an improved process for the production of polymers from bis(halomethyl)aromatic compounds. In accordance with another aspect, this invention relates to novel polymers of bis(halomethyl)aromatic compounds which are soluble in hydrocarbon solvents and which are fusible under ordinary molding conditions and, therefore, are readily molded and extruded into various forms and shapes including sheets and fibers.

The preparation of polymers of o- and p-xylylene is well known and numerous studies have been made to clarify the mechanisms involved in developing reactive monomers of the o- and p-xylylene type. However, the polymeric products obtained from these monomers have had little commercial interest because of their insolubility and infusibility. It being substantially impossible to utilize them in the production of molded objects for these reasons. Thus, these polymers have had almost no utility. Therefore, it can be seen that there is a distinct need in the art for moldable polymers of the xylylene-type.

Accordingly, the present invention relates to an improved process for the production of polymers from bis(halomethyl)aromatic compounds which are soluble in hydrocarbon solvents and which are fusible. Furthermore, the novel polymers prepared in accordance with the invention have high tensile strength and extremely high melting temperatures and, therefore, are suited for use in the fabrication of articles which can be made to withstand considerable stress at elevated temperatures.

Therefore, an object of this invention is to prepare a novel moldable polymer.

A further object of this invention is to prepare a polymer from a bis(halomethyl)aromatic compound.

A further object of this invention is to provide a polymer of a bis(halomethyl)aromatic compound which is hydrocarbon soluble and fusible.

A still further object of this invention is to provide an improved process for the production of moldable polymers from bis(halomethyl)aromatic compounds.

Other aspects, objects and the several advantages of this invention are apparent with a study of the disclosure and the appended claims.

In accordance with the present invention, fusible xylylene-type polymers are prepared by reacting or contacting a bis(halomethyl)aromatic compound with a finely divided metal reactant or dehalogenating agent in a polar organic solvent in the presence of a free radical acceptor. The polymers produced by the present process are fusible and soluble in hydrocarbon solvents such as tetralin. Furthermore, the polymers produced by the present process have very high melting points and are capable of being molded or extruded into various shapes and forms.

More specifically, I have found that fusible xylylene-type polymers can be readily prepared by contacting a bis(halomethyl)aromatic compound with a finely divided metal selected from the group of metals consisting of those metals above nickel up to and including magnesium in the electromotive series in a polar organic solvent and in the presence of anthracene.

The bis(halomethyl)aromatic compounds employed include compounds of the general type $XCH_2ZCH_2X$ in which X is a halogen selected from the group consisting of chlorine, bromine, and iodine and Z is an aromatic structure. The $—CH_2X$ groups are so placed on the aromatic structure that on removal of the X atoms, a quinonoid structure can be formed by rearrangement of the electronic distribution in the cyclic portion of the molecule. For example, in the bis(halomethyl)benzenes useful in the present invention, the halomethyl groups will be in either the ortho or para positions with respect to each other on the benzene ring. In the bis(halomethyl)naphthalenes, these groups can be in the 1,4- or 2,3-positions on a single ring of the molecule or they can be in the 2,6- or 3,7-positions. Similarly, compounds containing annular nitrogen are applicable in the practice of the invention if the above-mentioned requirement is met. For example, 2,5- or 3,6-dihalomethylpyridines can be used or dihalomethylquinolines capable of forming quinonoid structures by removal of the halogens from the halomethyl groups can be used.

Example of compounds of the above type are:

1,4-bis(chloromethyl)benzene
1,2-bis(chloromethyl)benzene
1,4-bis(chloromethyl)naphthalene
2,3-bis(chloromethyl)naphthalene
2,6-bis(chloromethyl)naphthalene
2,5-bis(chloromethyl)pyridine
2,3-bis(chloromethyl)pyridine
5,8-bis(chloromethyl)quinoline
6,7-bis(chloromethyl)quinoline
2,3-bis(chloromethyl)quinoline
3,7-bis(chloromethyl)quinoline
1,4-bis(bromomethyl)benzene
1,2-bis(iodomethyl)benzene
1,4-bis(bromomethyl)naphthalene
2,6-bis(bromomethyl)naphthalene
2,6-bis(iodomethyl)naphthalene
2,5-bis(bromomethyl)pyridine
2,3-bis(iodomethyl)pyridine
6,7-bis(bromomethyl)quinoline
2,3-bis(iodomethyl)quinoline and the like The above-listed compounds contain 7–12 carbon atoms. The presence of from one to three methyl substituents on ring carbon atoms unoccupied by a halomethyl group is permissible, in which event, the total carbon atoms can be 15. Examples of suitable aromatic compounds have methyl substituents include:

2-methyl-1,4-bis(chloromethyl)benzene
3-methyl-1,2-bis(chloromethyl)benzene
4-methyl-1,2-bis(chloromethyl)benzene
2-methyl-1,4-bis(bromomethyl)benzene
4-methyl-1,2-bis(iodomethyl)benzene
1,4-bis(chloromethyl)-2-methylnaphthalene
2,5-bis(chloromethyl)-4-methylpyridine
5,8-bis(chloromethyl)-7-methylquinoline
2,3-bis(bromomethyl)-8-methylquinoline
1,2,4-trimethyl-3,7-bis(chloromethyl)naphthalene
1,6,7-trimethyl-2,3-bis(chloromethyl)naphthalene
2,4-dimethyl-3,7-bis(chloromethyl)quinoline and the like The term "aromatic" in the present application includes structure containing annular nitrogen atom, typified by pyridine and quinoline nuclei.

The finely divided metal reactant or dehalogenating agent of the present invention is selected from those metals which are above nickel up to and including magnesium in the electromotive series as defined on page 154 of "Inorganic Chemistry," Thorne et al., 5th ed., Interscience Publishers, Inc., New York, New York, 1948. Metals in this group include magnesium, beryllium, aluminum, manganese, zinc, chromium, gallium, iron, cadmium, tellurium, and cobalt. Preferably, the metal is selected from the group consisting of magnesium, aluminum, manganese, zinc, chromium, and iron. The finely divided metal is added to the reaction mixture in a finely divided form, preferably 100 mesh or finer. U.S. Standard sieve sizes are intended whenever sieve or mesh sizes are used herein. The amount of powdered metal employed in the process of the invention will generally be at least one equivalent of metal for each equivalent of halogen. For example, when operating with zinc, one mole of metal is added for each mole of bis(halomethyl)aromatic compound. Somewhat greater amounts can be used when desired.

As indicated above, the present invention is carried out in the presence of a polar organic solvent. Suitable organic solvents which can be employed in the present invention include, for example, alcohols containing from 1 to 5 carbon atoms such as methanol, ethanol, isopropanol, and n-pentanol; alkylated amides of lower molecular weight aliphatic acids such as dimethylformamide, dimethylacetamide, and dimethylpropionamide; lower molecular weight dialkylsulfoxides such as dimethylsulfoxide, diethylsulfoxide; lower molecular weight nitriles such as acetonitrile, propionitrile, and isobutyronitrile; esters such as ethyl benzoate, benzyl benzoate, and the like; and the various glycol ethers such as the Cellosolves and the like. The particular polar organic solvent employed will depend to a large extent on the particular metal which is used in the reaction. However, for most of the metals I prefer to use the lower molecular weight alcohols. In any event, it is necessary to employ a solvent which is nonreactive with the metal used in the reaction. The amount of solvent employed will generally range from about 2 to about 10 parts per part of bis(halomethyl)aromatic compound.

The free radical acceptor employed, preferably anthracene, will be present in the reaction in a concentration ranging from 0.25 to 0.75 mole anthracene per mole of bis(halomethyl)aromatic monomer, preferably 0.5 mole anthracene per mole of bis(halomethyl)aromatic monomer.

Generally, the ingredients of the reaction are charged to a reactor which is maintained at a temperature in the approximate range of 50° F. to 300° F. for about 1 to 100 hours or more.

The novel moldable polymers of this invention are readily prepared by placing a bis(halomethyl)aromatic compound in a reaction vessel with a powdered metal, as defined, in a polar solvent and anthracene. The reaction mixture is then heated and agitated. The temperature of the reaction mixture is maintained generally in the range between 50° and 300° F. for at least 1 hour. The length of time required to obtain a given conversion is dependent upon the reaction temperature and the reactivity of the powdered metal employed. The reaction mixture is generally treated to recover polymer and to remove any free metal or other impurities, and the polymer is then dried.

At the end of the reaction period the contents of the reactor can be filtered to recover the polymer. The solids are treated with a suitable acid or base, such as concentrated hydrochloric acid or aqueous NaOH to remove metal salts and free metal, after which the polymer is collected in a filter and washed, preferably with water followed by methanol. It is usually desirable to break up the filter cake, say, in a comminuting device such as a Waring blender, conducting this operation in a wash liquid such as methanol after which the polymer is collected on a filter and dried.

The polymers obtained as described above are soluble in hydrocarbon solvents, such as boiling tetralin, and can be molded at a temperature above about 400° F., preferably between 500° and 700° F.

A more comprehensive understanding of the invention can be obtained by referring to the following illustrative example which is not intended, however, to be unduly limitative of the invention.

*Example I*

Runs were made to produce a fusible and soluble p-xylylene polymer by charging the following materials to each of two 32 ounce bottles:

35.0 g. (0.2 mole) 1,4-bis(chloromethyl)benzene
13.0 g. (0.2 mole) zinc powder
17.8 g. (0.1 mole) anthracene
250 ml. methanol The bottles were sealed, placed in a 122° F. water bath and rotated for about two days. The bottles were removed from the water bath and allowed to come to room temperature after which the precipitate was filtered out. The filter cake was then washed for one-half hour with concentrated hydrochloric acid to dissolve any zinc appearing in the filter cake. After the acid wash, the filter cake was washed with water, acetone, and methanol and dried overnight in a vacuum drier at 147° F. The total white polymer yield was 45.8 grams from both bottles. An analysis of a small sample of the polymer by infrared spectrograph revealed that anthracene is present in the polymer.

The polymer is soluble in boiling tetralin and is fusible. Solubility is determined by placing a small piece (about 0.01 gram) of polymer cut from a compression molded specimen in about 20 ml. of tetralin and heating. The melting point of the p-xylylene polymer is between 445° and 460° F. The polymer was readily compression molded at a temperature above its melting point.

The polymers of the invention can be formed into items such as dishes, poker chips, pipe, gears etc., by various molding processes such as injection molding, vacuum forming, and the like.

It will be evident to those skilled in the art that many variations and modifications can be practiced upon consideration of the foregoing disclosure. And such variations and modifications are believed to be within the spirit and scope of the present invention.

I claim:

1. A process for the preparation of a polymer which comprises reacting a bis(halomethyl)aromatic compound capable of forming a quinonoid structure on removal of the halo atoms selected from the group consisting of bis(halomethyl)benzenes, bis(halomethyl)naphthalenes, bis(halomethyl)pyridines and bis(halomethyl)quinolines with anthracene in the presence of finely divided metal reactant selected from teh group consisting of cobalt, tellurim, cadmium, iron, gallium, chromium, zinc, manganese, aluminum, beryllium and magnesium in an alcohol diluent at a temperature ranging from about 50 to about 300° F.

2. A process for preparing a moldable polymer which comprises contacting 1,4-bis(chloromethyl)benzene, zinc dust, anthracene and methanol at a temperature ranging from about 50 to about 300° F. for a time sufficient to form a desired amount of polymer, and recovering polymer thus produced.

3. A polymer prepared by reacting a bis(halomethyl) aromatic compound with a finely divided metal reactant selected from the group consisting of cobalt, tellurium, cadmium, iron, gallium, chromium, zinc, manganese, aluminum, beryllium and magnesium, and anthracene in an organic polar diluent, the amount of anthracene ranging from 0.25 to 0.75 mol per mol bis(halomethyl)aromatic compound.

4. A polymer moldable above about 400° F. prepared by polymerizing 1,4-bis(chloromethyl)benzene in the presence of methanol diluent, anthracene and zinc dust at a temperature ranging from about 50 to about 300° F., said polymer being soluble in boiling tetralin.

5. The molded polymer of claim 4.

(References on following page)

References Cited by the Examiner

UNITED STATES PATENTS

| | | | |
|---|---|---|---|
| 2,414,028 | 1/47 | Dietrich et al. | 260—2 |
| 2,719,131 | 9/55 | Hall | 260—2 |

FOREIGN PATENTS

| | | |
|---|---|---|
| 517,738 | 2/40 | Great Britain. |

OTHER REFERENCES

Mann et al.: Journal Chemical Society, pages 2826–32 (1954).

Auspos et al.: Journal of Polymer Science, vol. 15 (1955), pages 19–29.

MURRAY TILLMAN, *Primary Examiner.*

H. N. BURSTEIN, J. R. LIBERMAN, *Examiners.*